US007860257B2

(12) United States Patent
Ota et al.

(10) Patent No.: US 7,860,257 B2
(45) Date of Patent: Dec. 28, 2010

(54) MIXER APPARATUS AND PARAMETER SETTING METHOD FOR THE APPARATUS, AND PROGRAM FOR THE APPARATUS AND METHOD

(75) Inventors: Mitsuhiko Ota, Hamamatsu (JP); Masaru Aiso, Hamamatsu (JP)

(73) Assignee: Yamaha Corporation, Hamamatsu-shi (JP)

( * ) Notice: Subject to any disclaimer, the term of this patent is extended or adjusted under 35 U.S.C. 154(b) by 1221 days.

(21) Appl. No.: 11/016,270

(22) Filed: Dec. 17, 2004

(65) Prior Publication Data

US 2005/0157830 A1 Jul. 21, 2005

(30) Foreign Application Priority Data

Dec. 25, 2003 (JP) ............................ 2003-429021

(51) Int. Cl.
*H04B 1/00* (2006.01)
*G06F 17/00* (2006.01)
*G05D 3/00* (2006.01)

(52) U.S. Cl. .......................... 381/119; 700/94; 318/466

(58) Field of Classification Search ................. 381/119; 700/94; 318/466-467
See application file for complete search history.

(56) References Cited

U.S. PATENT DOCUMENTS 4,479,240 A * 10/1984 McKinley, Jr. .............. 381/119
5,054,077 A * 10/1991 Suzuki ........................ 381/119
6,434,242 B2 * 8/2002 Yamada et al. .............. 381/119
6,839,441 B1 * 1/2005 Powers et al. ............... 381/119
7,200,728 B2 4/2007 Okabayashi et al.
2002/0156547 A1 10/2002 Suyama et al.
2003/0231776 A1 12/2003 Aoki et al.

FOREIGN PATENT DOCUMENTS

JP 05-276128 10/1993
JP 2003259210 9/2003
WO WO-91/18456 11/1991
WO WO-93/03549 2/1993

OTHER PUBLICATIONS

Yamaha, DM2000 Owner's Manual, 2002, Yamaha Corporation, pp. 3-5 11, 12, 39, 103, 155, 236, and 302.*
Yamaha, DM2000 Owner's Manual, 2002, Yamaha Corporation, pp. 1, 6, 7, 39-43, 71, 82, 108-110, 208, 230, 240, and 241.*
Yamaha, DM2000 Owner's Manual, 2002, Yamaha Corporation, p. 138.*
DM2000 Owner's Manual, Yamaha Corporation, pp. 157-181—2002.
Notice of Grounds for Rejection (Office Action) for Japanese Patent Application No. 2003-429021, mailed Jan. 20, 2009 (4 pages).

* cited by examiner

*Primary Examiner*—Curtis Kuntz
*Assistant Examiner*—Jesse A Elbin
(74) *Attorney, Agent, or Firm*—Morrison & Foerster LLP

(57) ABSTRACT

In order to define current states of a mixer, a set of first-type data (scene data) that define processing to be performed on a signal second-type data and a set of second-type data (snapshot data) comprising a group of parameters that define functions or displaying styles of operators or displays are stored in a current area. Storage area or memory is provided for preserving the second-type data, so that the second-type data can be written from the current area into the storage area or recalled from the storage area into the current area in accordance with a user instruction.

1 Claim, 14 Drawing Sheets

MIXER APPARATUS AND PARAMETER SETTING METHOD FOR THE APPARATUS, AND PROGRAM FOR THE APPARATUS AND METHOD

BACKGROUND OF THE INVENTION

The present invention relates to mixer apparatus, such as digital audio mixers, and mixer parameter setting methods suitable for use with digital mixers, and computer programs for such mixer apparatus and parameter setting methods.

Recent digital mixers are provided with a function ("scene recall function") of storing, in memory as "scene data", parameter values set via faders, volume control operators, etc., ON/OFF states of various buttons and other parameters related to audio or sound signal processing of the digital mixer and then reproducing or recalling the thus-stored scene data through one-touch operation by the user. By recording in advance mixing states (mixing settings) of various scenes, for example, in theathrical performances, music concerts, etc., the user can use the scene recall function to promptly reproduce necessary mixing states. One example of such a conventional mixing technique is shown in pages 157-181 of "DM2000 Instruction Manual", published by Yamaha Corporation in February, 2002.

According to the conventional mixing technique, parameters that are stored as the scene data are only such parameters intended to directly impart variations to audio or sound signals; for example, the scene data do not include parameters for defining respective functions of various operators on an operation panel or displaying styles of display devices and elements on the operation panel. Namely, various functions of the operation panel and displaying styles are always set by manual operation of the user or human operator. However, with the conventional mixing technique, the human operator can not promptly set a function of each of the operators or displaying style of each of the display devices and elements, and thus, it has been very cumbersome for the human operator to make corresponding settings through manual operation each time frequently-required functions or displaying styles are to be used.

SUMMARY OF THE INVENTION

In view of the foregoing, it is an object of the present invention to provide an improved mixer apparatus and parameter setting method therefor which allow respective functions of various operators or displaying styles of various display devices and elements to be set promptly, as well as a computer program for the mixer apparatus and parameter setting method.

In order to accomplish the above-mentioned object, the present invention provides an improved mixer apparatus, which comprises a first storage section that stores therein a current set of first-type data and a current set of second-type data in order to define a current state of the mixer apparatus, the first-type data comprising a group of parameters defining processing to be performed by the mixer apparatus on an audio or sound signal, the second-type data comprising a group of parameters defining functions or displaying style of operators or display of the mixer apparatus. The mixer apparatus of the present invention also comprises a second storage section also comprises an instruction section that instructs writing or readout of a set of the second-type data to or from the second storage section; and a processing section that, when the writing has been instructed by the instruction section, writes the current set of the second-type data, stored in the first storage section, into the second storage section. But, when the readout has been instructed by the instruction section, the processing section reads out, from the second storage section, a set of the second-type data stored therein and then updates, with the read-out set of the second-type data, the current set of the second-type data stored in the first storage section.

The first-type data, comprising a group of parameters defining processing to be performed by the mixer apparatus on an audio or sound signal, are called "scene data" in the field of mixers and so called in the following description of preferred embodiments of the present invention as well. On the other hand, the second-type data, comprising a group of parameters defining functions or displaying style of operators or display of the mixer apparatus, are called "snapshot" in the following description of the preferred embodiments, for convenience of explanation.

According to the present invention, the current set of the second-type data (i.e., snapshot data) stored in the first storage section (i.e., current memory) can be preserved in the second storage section (such as a non-volatile memory like a flash memory). Also, in the present invention, the set of the second-type data (snapshot data) preserved in the second storage section is read out, so that the current set of the second-type data stored in the first storage section can be updated with the read-out set of the second-type data; in other words, the set of the second-type data can be recalled. With such arrangements, the user can preserve, in sets, not only the group of parameters defining processing to be performed by the mixer apparatus on an audio or sound signal but also the group of parameters defining functions or displaying style of the operators or display of the mixer apparatus, and can freely recall these parameter groups for collective reproduction. As a result, the user can promptly set functions or displaying style of the operators or display.

The mixer apparatus of the present invention may further comprise: a third storage section; a further instruction section that instructs writing or readout of a set of the first-type data to or from the third storage section; and a processing section that, when the writing has been instructed by the further instruction section, writes the current set of the first-type data, stored in the first storage section, into the third storage section, but, when the readout has been instructed by the instruction section, reads out, from the third storage section, a set of the first-type data stored therein and then updates, with the read-out set of the first-type data, the current set of the first-type data stored in the first storage section. With such arrangements, processes conventionally known as preservation and recall of "scene data" can of course be performed in combination by the present invention. In such a case, the first-type data (scene data) and the second-type data (snapshot data) may be individually preserved or recalled in accordance with separate instructions, or alternatively, both the first-type data (scene data) and the second-type data (snapshot data) may be preserved or recalled in accordance with a preservation or recall instruction given for only one of the first- and second-type data.

Further, in the present invention, the operators of the mixer apparatus are signal operators each provided for setting a parameter to define processing to be performed on an audio or sound signal, and at least one of the signal operators is sharable between a plurality of functions. The mixer apparatus may further comprise: function setting operators to be used for setting functions of the signal operators; and an updating section that, in response to operation of any one of the signal operators, updates a corresponding parameter included in the first-type data stored in the first storage section, but, in response to operation of any one of the function setting operators, updates a corresponding parameter included in the second-type data stored in the first storage section.

The mixer apparatus of the present invention may further comprise a control section. When the readout has been instructed by the instruction section and the function of any one of the signal operators has been changed on the basis of the parameter corresponding to any one of the function setting operators and included in the updated second-type data stored in the first storage section, the control section automatically changes an operated amount of the signal operator to an operated amount corresponding to the changed function.

The present invention may be constructed and implemented not only as the apparatus invention as discussed above but also as a method invention. Also, the present invention may be arranged and implemented as a software program for execution by a processor such as a computer or DSP, as well as a storage medium storing such a software program. Further, the processor used in the present invention may comprise a dedicated processor with dedicated logic built in hardware, not to mention a computer or other general-purpose type processor capable of running a desired software program.

The following will describe embodiments of the present invention, but it should be appreciated that the present invention is not limited to the described embodiments and various modifications of the invention are possible without departing from the basic principles. The scope of the present invention is therefore to be determined solely by the appended claims.

BRIEF DESCRIPTION OF THE DRAWINGS

For better understanding of the object and other features of the present invention, its preferred embodiments will be described hereinbelow in greater detail with reference to the accompanying drawings, in which.

DETAILED DESCRIPTION OF THE INVENTION

Figure 1:
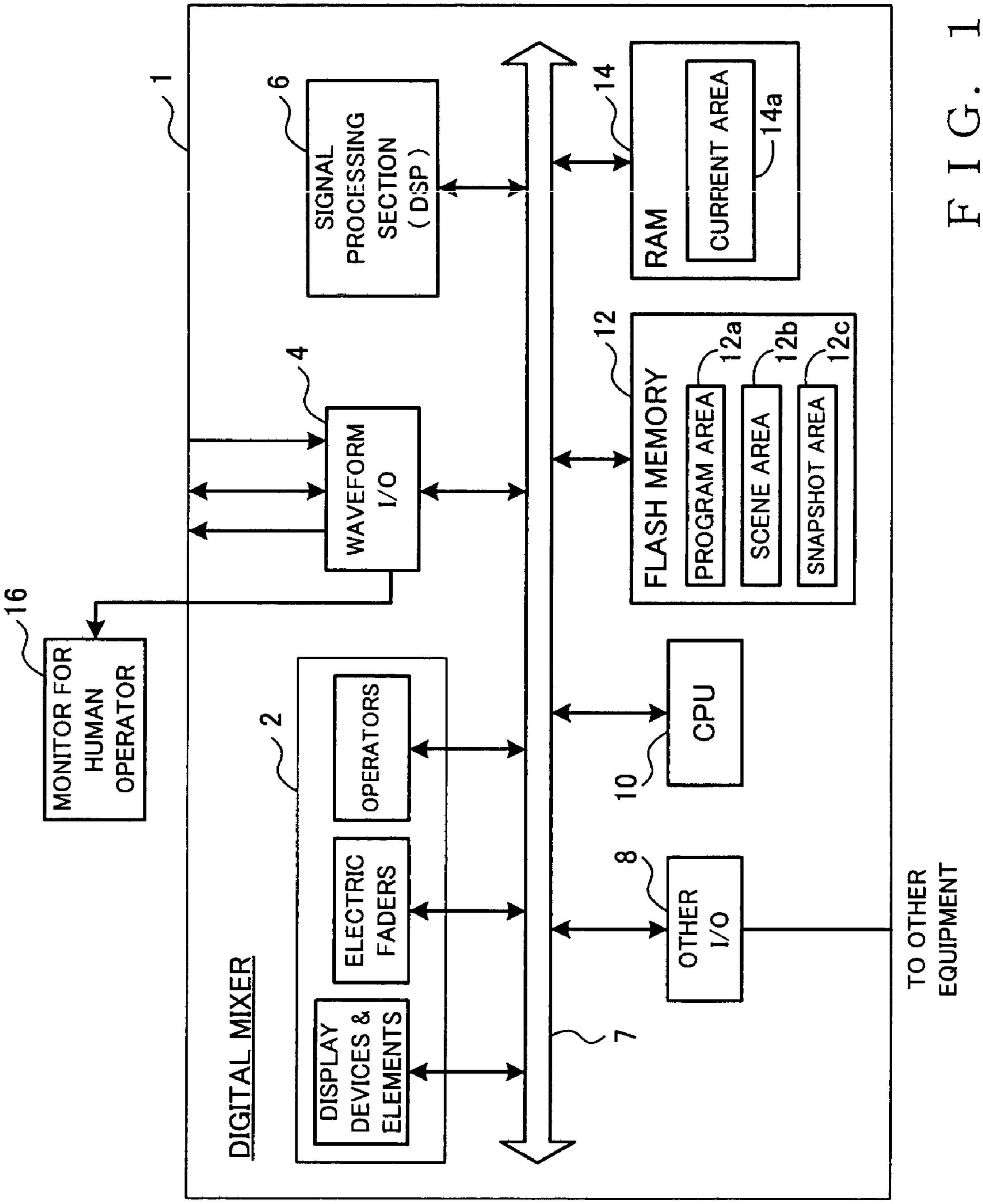
FIG. 1 is a block diagram showing an example general hardware setup of a digital mixer in accordance with an embodiment of the present invention.

1. Example Hardware Setup of Embodiment:

A description will be made about an example general hardware setup of a digital mixer 1 in accordance with an embodiment of the present invention, with reference to FIG. 1.

As shown, the digital mixer of the present invention includes an operation panel 2 that in turn includes various display devices and elements, operator members (i.e., operators operable by a human operator), etc. Among the "operators" are electric faders, rotary encoders and keys. Once any one of the electric faders is operated by the human operator, the current operating state of the operated electric fader is output via a bus 7. Similarly, once any one of the rotary encoders and keys is operated, the current operating state of the operated encoder or key is output via the bus 7. Mouse and keyboard of a personal computer can also be connected to the digital mixer of the present invention. Let it be assumed here that the mouse and keyboard of the personal computer are also included in the operator group of the operation panel 2.

When an operation command has been supplied via the bus 7 to any one of the electric faders, that electric fader is automatically set to a predetermined operating position corresponding to the command. In contrast to the electric faders, the rotary encoders and keys of the mixer are never automatically driven physically via an operation command. Each of the keys has an LED built therein and indicates its ON/OFF state by an ON/OFF (i.e., illuminated/deilluminated) state of the built-in LED. In some cases, the illuminated/deilluminated states of the LEDs may be automatically set via the bus 7.

Figure 7:
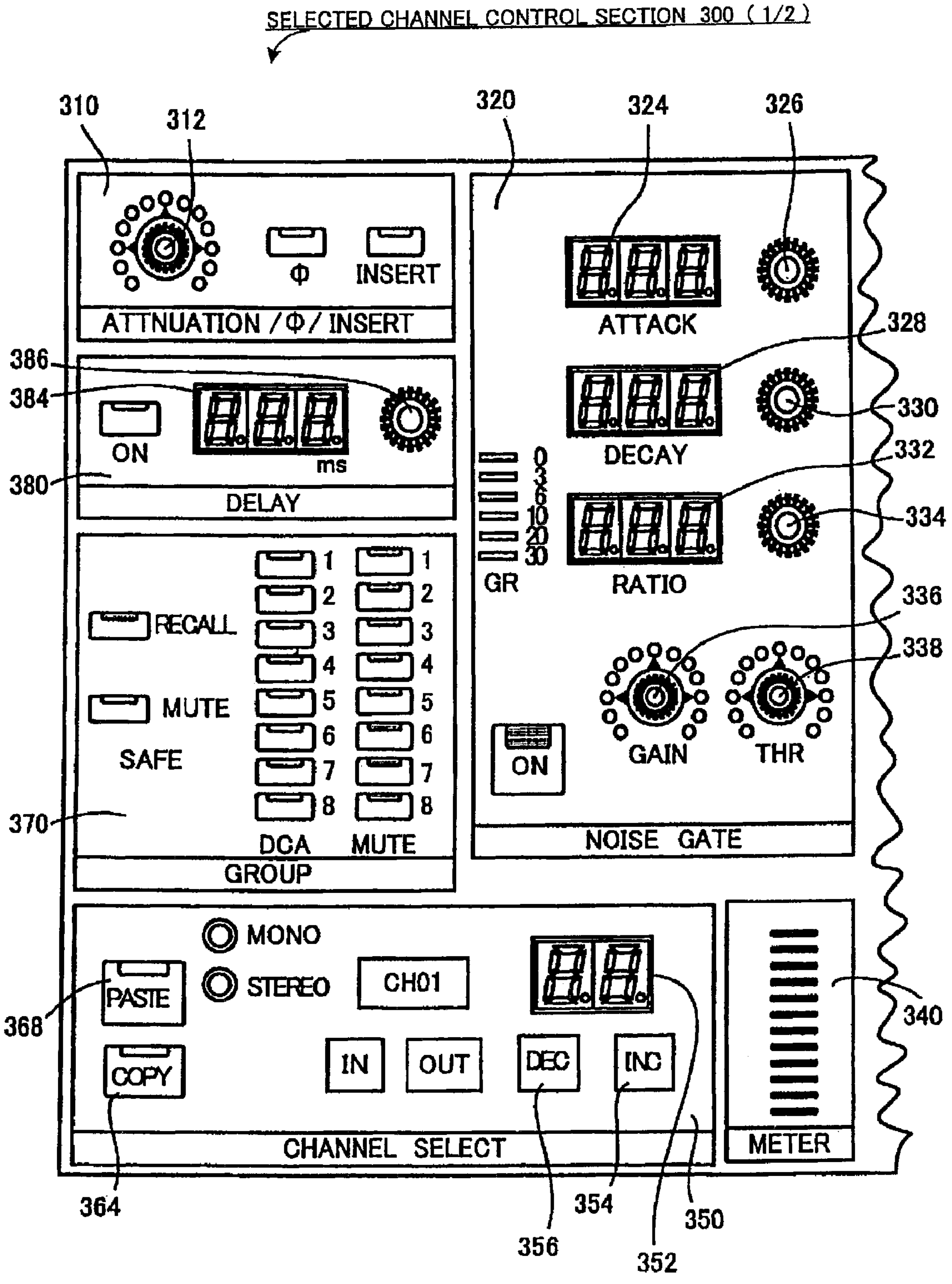
FIG. 7 is a schematic top plan view showing a left half of a selected channel control section of the digital mixer.
Figure 8:
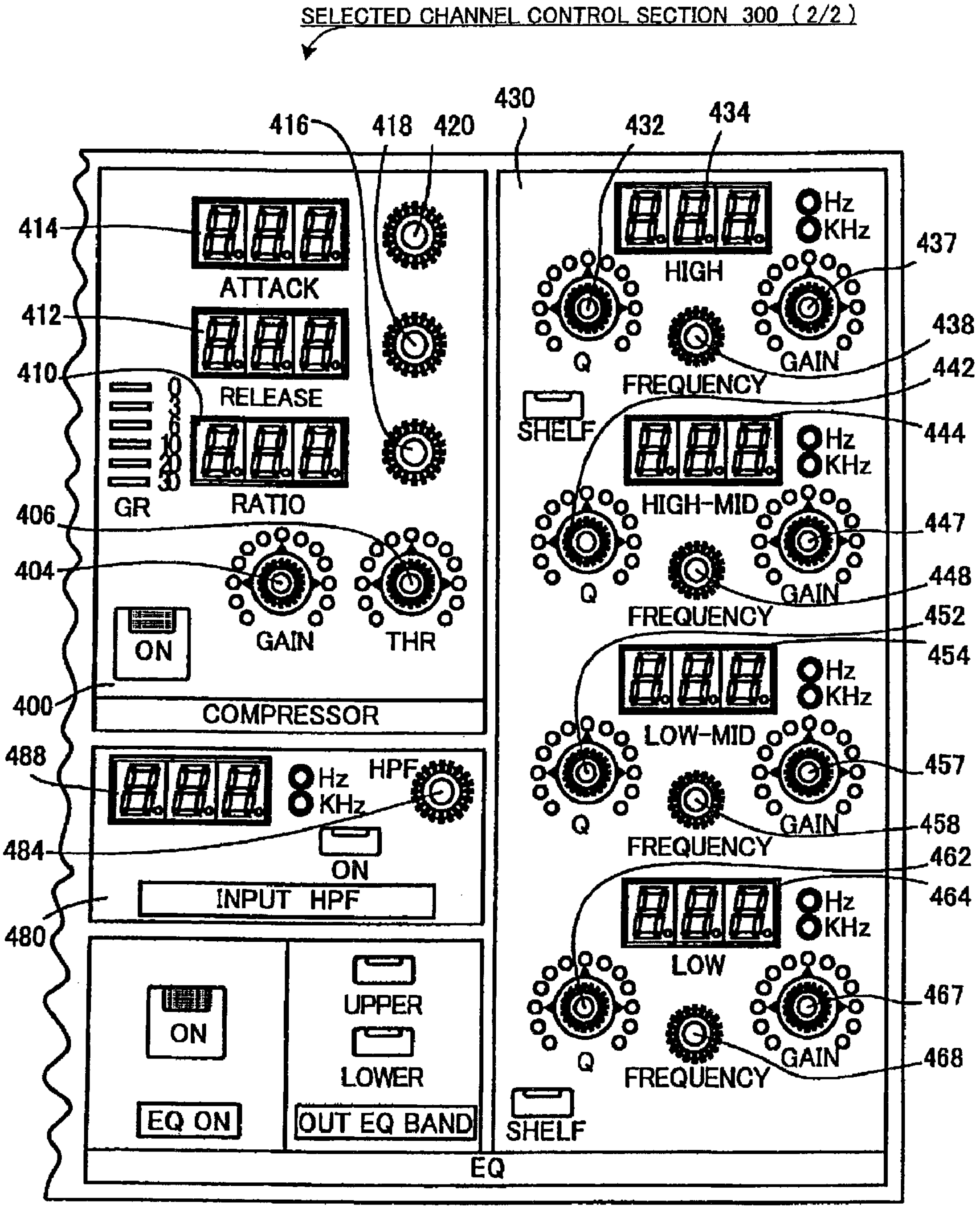
FIG. 8 is a schematic plan view showing a right half of the selected channel control section of the digital mixer.

As display elements corresponding to the rotary encoders, there are employed a plurality of LEDs arranged circularly around each predetermined rotary encoder (e.g., rotary encoder 312 336, 338, 404, 406, 432, 437, 442, 447, 452, 457, 462, and 467 of FIGS. 7 and 8), or eight-segment LED provided in the neighborhood of each predetermined rotary encoder (e.g., display element 324, 328, 332, 384, 410, 412, 414, 434, 444, 454, 464, and 488, corresponding to the rotary encoder 326, 330, 334, 386, 416, 418, 420, 438, 448, 458, 468, and 484 of FIGS. 7 and 8). In the former case, one or more of the LEDs, corresponding to a current operated amount of the associated rotary encoder, are turned on or illuminated, while, in the latter case, the display element indicates, in a numerical value, a current operated amount of the associated rotary encoder. Thus, in either case, the current operated amount of each of the rotary encoders can be automatically indicated by the display element. Specific construction of the operation panel 2 will be explained later.

Referring back to FIG. 1, reference numeral 4 represents a waveform I/O section which performs input/output of analog or digital audio or sound signals. In the instant embodiment, mixing processing, effect processing, etc. of various audio or sound signals (for convenience, hereinafter referred to as "sound signals") are all carried out in a digital manner. However, in many cases, sound signals input to the digital mixer from the outside and sound signals to be output to the outside are in analog representation. Therefore, in the waveform I/O section 4, any desired one or more of cards having various functions are inserted as necessary, and necessary conversion processes can be performed by these cards. Portion of the analog output is audibly reproduced or sounded through a monitor device 16 intended for monitoring by the human operator.

The digital mixer also includes a signal processing section 6 which is in the form of a group of DSPs (Digital Signal Processors). The signal processing section 6 performs mixing processing and effect processing on digital sound signals supplied via the waveform I/O section 4, and it outputs processed results to the waveform I/O section 4. Reference numeral 8 represents another or further I/O section, which transmits and receives a time code and other information to and from various external equipment. Note that the instant embodiment can remote-control the external equipment via the other I/O section 8. Reference numeral 10 represents a CPU, which controls various components of the digital mixer via the bus 7 on the basis of various control programs to be later described. Flash memory 12 includes a program area 12*a* where the above-mentioned control programs are stored. RAM 14 is used as a working memory for the CPU 10.

Note that ever-changing settings (i.e., setting states) of the digital mixer are herein referred to as “current data”, which are stored in a current area 14*a* within a RAM 14. The current data comprise “current scene data” (i.e., current set of first-type data) including a group of parameters for directly operating on or varying a sound signal, and “current snapshot data” (i.e., current set of second-type data) including a group of parameters for defining functions of the various operators or displaying styles of the various display devices and elements. In the instant embodiment of the digital mixer, the contents of the current scene data can be stored as “scene data” (first-type data) in a scene area 12*b* of the flash memory 12 or other suitable storage device; a plurality of types or sets of scene data can be stored at a time in the scene area 12*b*. Similarly, the contents of the current snapshot data can be stored as “snapshot data” (second-type data) in a snapshot area 12*c* of the flash memory 12; a plurality of sets of snapshot data can be stored at a time in the snapshot area 12*c*.

Figure 3:
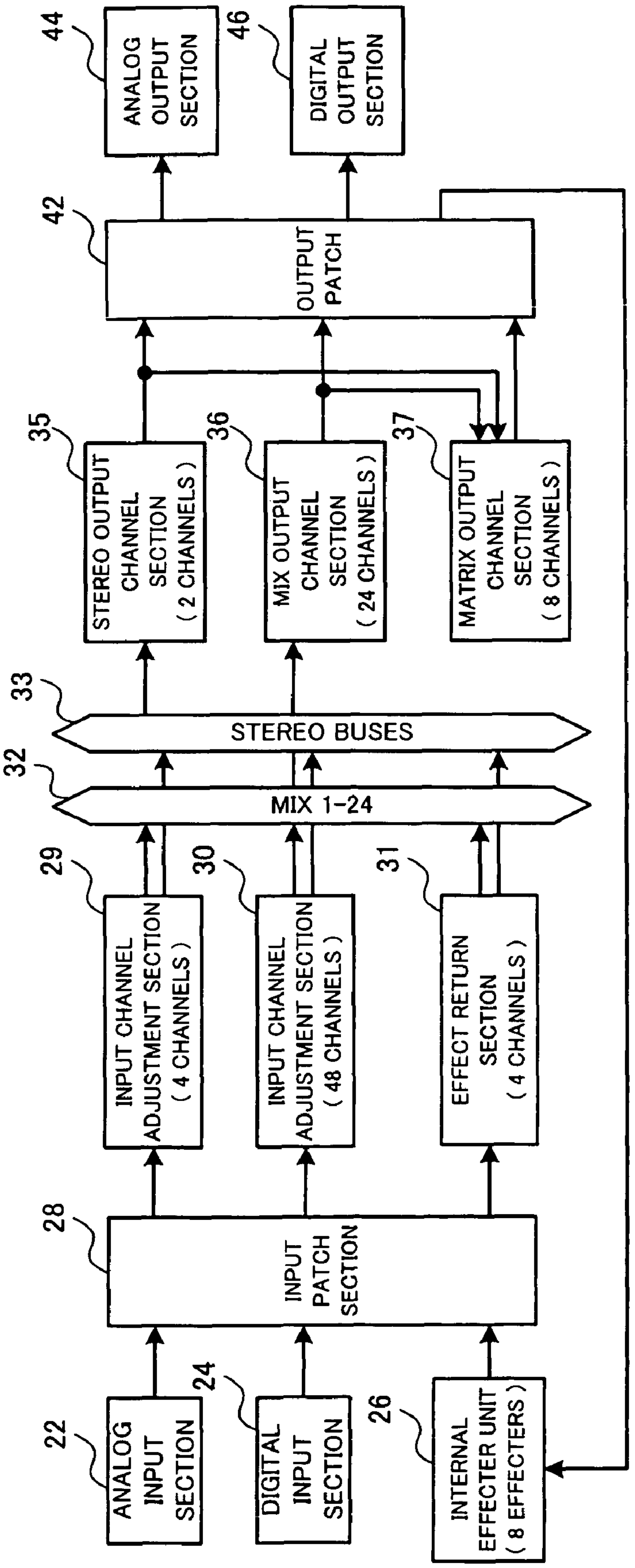
FIG. 3 is a block diagram showing a mixing algorithm of the digital mixer of the invention.

2. Construction of Mixing Algorithm in the Embodiment:

The following paragraphs describe contents of an algorithm implemented in the signal processing section 6 etc. of the digital mixer, with reference to FIG. 3.

In FIG. 3, reference numeral 22 represents an analog input section, which, upon receipt of a microphone-level or line-level analog sound signal, converts the analog sound signal into a digital sound signal and supplies the digital sound signal to the signal processing section 6. Reference numeral 24 represents a digital input section, which, upon receipt of a digital sound signal, converts the digital sound signal into an internal format of the signal processing section 6. 44 represents an analog output section, which converts a digital sound signal, supplied from the signal processing section 6, into an analog sound signal and outputs the analog sound signal to the outside. 46 represents a digital output section, which converts a digital sound signal of the internal format, supplied from the signal processing section 6, into a digital sound signal of a predetermined format (AES/EBU, ADAT, TASCAM or the like) and outputs the thus-converted digital sound signal to the outside.

Whereas the above-described arrangements are implemented by the waveform I/O section 4 that is a separate hardware component from the signal processing section 6, and various cards inserted in the waveform I/O section 4, other arrangements than the above-described are implemented by programs running in the signal processing section 6. Reference numeral 30 represents an input channel adjustment section, which performs adjustment of sound volume, sound quality, etc. on a maximum of “48” (forty eight) input channels on the basis of operation of the electric faders and operator members provided on the operation panel 2. 29 represents a stereo input channel adjustment section 29 performs adjustment of sound volume, sound quality, etc. on a maximum of four stereo input channels. Let it be assumed here that a stereo sound signal of each stereo channel is composed of left- and right-channel sound signals.

Reference numeral 31 represents an effect return section, which adjusts a sound volume, sound quality, etc. of sound signals of four channels. Note that the effect return section 31 is allocated primarily to sound signals having been subjected to an effect process. Input patch section 28 allocates digital sound signals, supplied from a plurality of input ports of the input sections 22, 24, etc., to given input channels of a stereo input channel adjustment section 29, input channel adjustment section 30 or effect return section 31. Internal effecter unit 26 can perform an effect process on sound signals of up to eight channels, and it supplies resulting effect-processed sound signals to the effect return section 31.

Reference numeral 32 represents a MIX bus group, which comprises “24” (twenty four) MIX buses. Each of the MIX buses mixes together digital sound signals of the individual input channels and stereo input channels supplied to the MIX bus and some of digital sound signals applied from the effect returns (hereinafter referred to as “sound signals of the input channels etc.”) to the MIX bus. In each of the input channels etc., it can be set, for each of the MIX buses, whether or not the sound signal should be supplied to the MIX buses. If the sound signal should be supplied to the MIX buses, send (i.e., signal delivery) levels to the MIX buses can also be set independently on the channel-by-channel basis.

Reference numeral 33 represents a stereo bus group comprising two stereo buses, which are constructed similarly to the above-mentioned MIX buses. Stereo output channel section 35 adjusts levels and sound quality of the mixed results from the stereo buses. MIX output channel section 36 adjusts levels and sound quality of the mixed results from each of the MIX buses. Reference numeral 37 represents a MATRIX output channel section that further mixes the output signals from the stereo output channel section 35 and MIX output channel section 36. 42 represents an output patch section that allocates the output signals from the stereo output channel section 35, MIX output channel section 36 and MATRIX output channel section 37 to given channels of each of the output section 44, 46 or the internal effecter unit 26.

Figure 2:
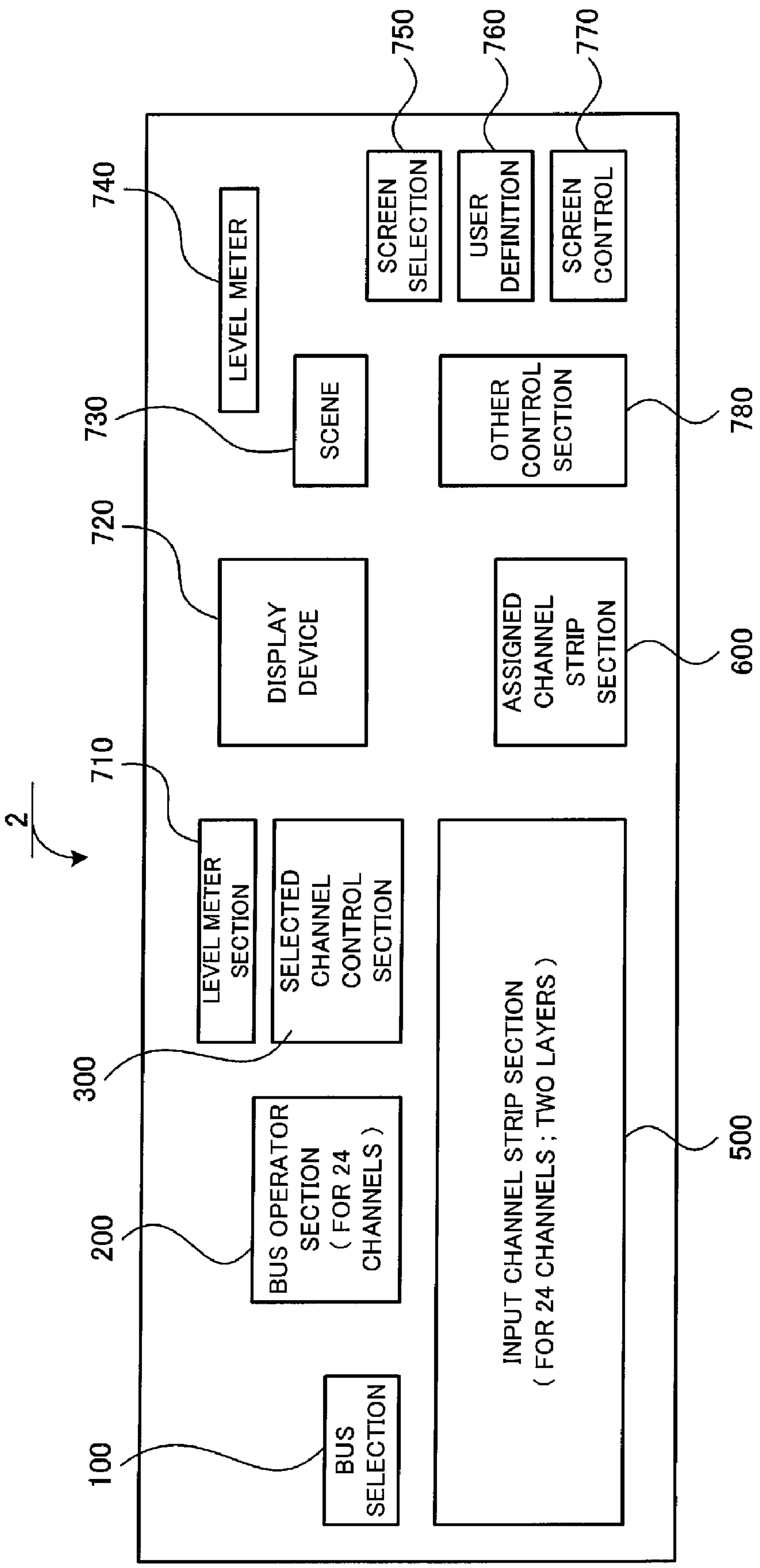
FIG. 2 is a schematic plan view of an operation panel of the digital mixer.

3. Construction of Operation Panel 2:

Next, an example general setup of the operation panel 2 is explained with reference to FIG. 2. In the Figure, reference numeral 100 represents a bus selection section, which includes operator members for selecting any one of the 24 MIX buses. 200 represents a but operator section, which includes operator members for adjusting send levels at which sound signals are to be sent from each of the input channels to the MIX buss selected by the bus selection section 100, and for making sound volume adjustment in the MIX output channel section 36. Further, a selected channel control section 300 includes operator members for making specific settings for sound quality adjustment processes, such as limiter, compressor and equalizer processes, for a selected input/output channel.

Reference numeral 500 represents an input channel strip section, which includes a plurality of faders for making sound volume adjustment of the input channels and other operator members. Assigned channel strip section 600, which includes faders and other operators, performs operations corresponding to a function assigned thereto, such as sound volume adjustment of the input channels etc., sound volume adjustment of the MIX channels etc. or DAC-group sound volume adjustment (to be later described). Level meter section 710 displays signal levels of input and output channels. Reference numeral 720 represents a display device (e.g., color LCD display), which displays any one of various setting screens etc. selected by the human operator. Reference numeral 730 represents a scene selection section, which allows the human operator to perform various operation, such as one for transferring stored contents of the current area 14*a* to the scene area 12*b* or one for reproducing scene data, already stored in the scene area 12*b*, in the current area 14*a*.

Reference numeral 750 represents a screen selection section, which controls a screen to be displayed on the display device 720. Displayed contents of the display device 720 can be set as desired, for example, to a compressor characteristic screen or equalizer characteristic screen when the human operator wants to make settings for the compressor process or equalizer process in the selected channel control section 300. 760 represents a user definition section which includes a plurality of keys to allow the user to freely define a desired function. 770 represents a screen control section, which includes cursor keys for moving a cursor shown on the display device 720, pointing device, data inputting rotary encoder, enter key, etc. 780 represents another control section which includes various other operator members etc. than the above-mentioned.

Figure 5:
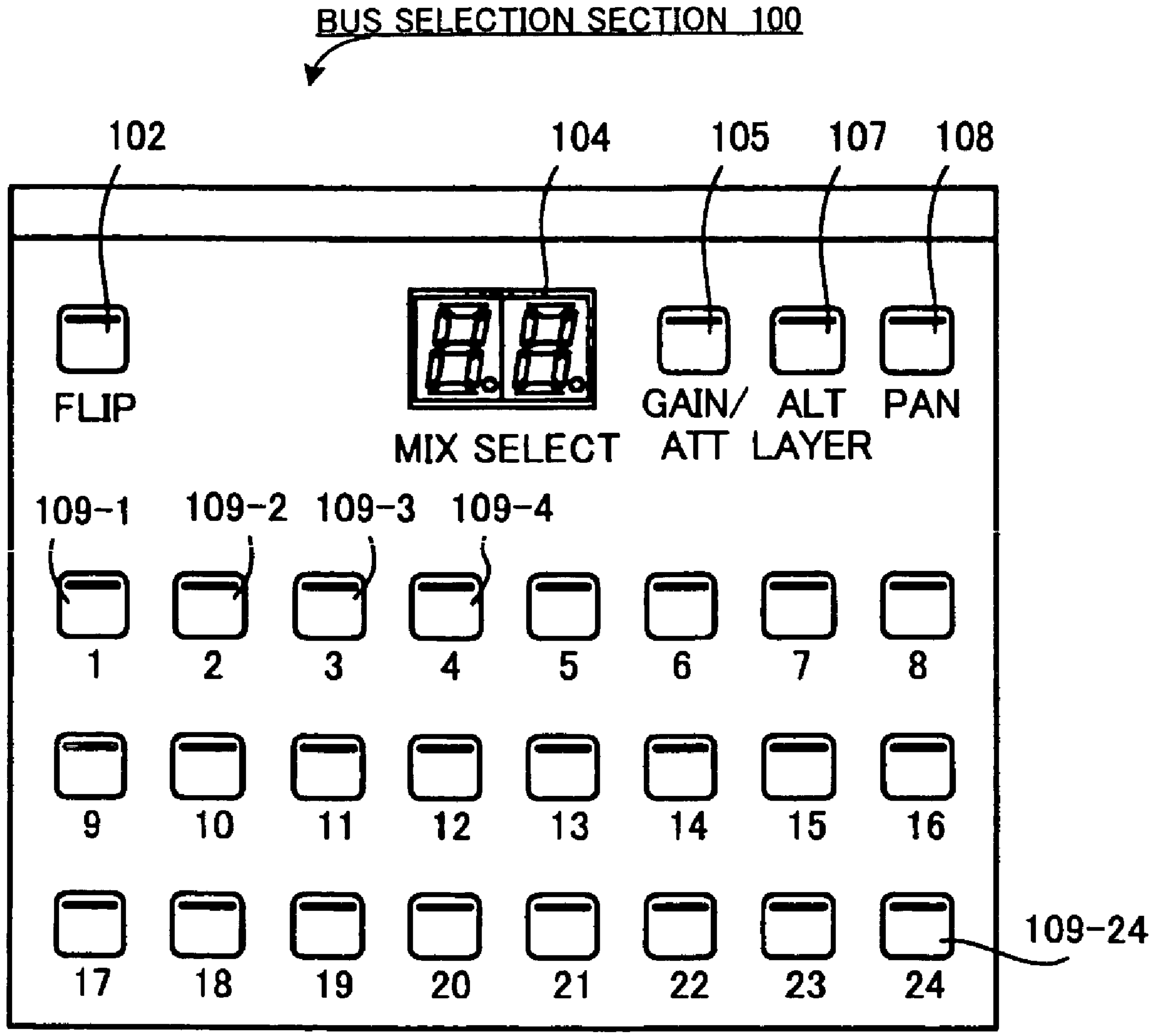
FIG. 5 is a schematic top plan view of a bus selection section of the digital mixer.

3.1. Bus Selection Section 100:

The following paragraphs describe principal parts of the operation panel 2, starting with a detailed construction of the bus selection section 100 shown in FIG. 5.

In FIG. 5, reference numerals 109-1-109-24 represent MIX bus selection keys; 24 MIX bus selection keys are provided in corresponding relation to the 24 channels of the 24 MIX buses. These MIX bus selection keys 109-1-109-24 are operable to select a MIX bus to be operated (hereinafter, "to-be-operated MIX bus") by a rotary encoder 514, ON key 512 etc. provided in the input channel strip section 500. Namely, in response to activation (turning-on operation) of one of the MIX bus selection keys 109-*k* corresponding to one of the MIX buses (k-th MIX bus) other than the to-be-operated MIX bus, the MIX bus selection key 109-*k* is illuminated, and the k-th MIX bus is selected as a new to-be-operated MIX bus.

Thus, when a plurality of the MIX bus selection keys are sequentially turned on, only the MIX bus corresponding to the last turned-on MIX bus selection key 109-*k* is selected as the to-be-operated MIX bus. Also, as the MIX bus selection key 109-*k* corresponding to the MIX bus already selected as the to-be-operated MIX bus is turned off, that MIX bus selection key 109-*k* is turned off, i.e. deilluminated, and the bus selection section 100 is brought to a non-bus-selecting state where no to-be-operated MIX bus is selected. The bus selection section 100 also includes an LED display 104, which displays a unique number (any one of "1"-"24") of the to-be-operated MIX bus or a character string "--" indicating the non-bus-selecting state.

The input channel strip section 500 can be set in a selected one of four operation modes (main operation modes), "MIXSEND mode", "GAIN/ATT mode", "ALT•LAYER mode" and "PAN mode". Once any one of the above-mentioned MIX bus selection keys 109-1-109-24 is depressed, the main operation mode of the input channel strip section 500 is set in the "MIXSEND mode". GAIN/ATT key 105, ALT•LAYER key 107 and PAN key 108 are each provided to set the main operation mode of the input channel strip section 500 in a corresponding one of the "GAIN/ATT mode", "ALT•LAYER mode" and "PAN mode".

Further, when the main operation mode of the input channel strip section 500 is the "MIXSEND mode" or "ALT•LAYER mode", it is possible to designate an ON/OFF state of another operation mode, "FLIP mode". Reference numeral 102 represents a FLIP key that switches, in a toggle-like fashion, between the ON/OFF states of the "FLIP mode". These keys each have an LED built therein that is turned on or illuminated when the corresponding operation mode is ON.

Selecting states of the above-mentioned MIX bus selection keys 109-1-109-24 and ON states of the operation modes corresponding to the above-mentioned keys 102, 105, 107 and 108 do not directly influence sound signals, but select respective functions etc. of the operator members of the input channel strip section 500. Therefore, the selecting states of the MIX bus selection keys 109-1-109-24 and ON states of the operation modes are stored as "current snapshot data" in the current area 14*a*.

Figure 9:
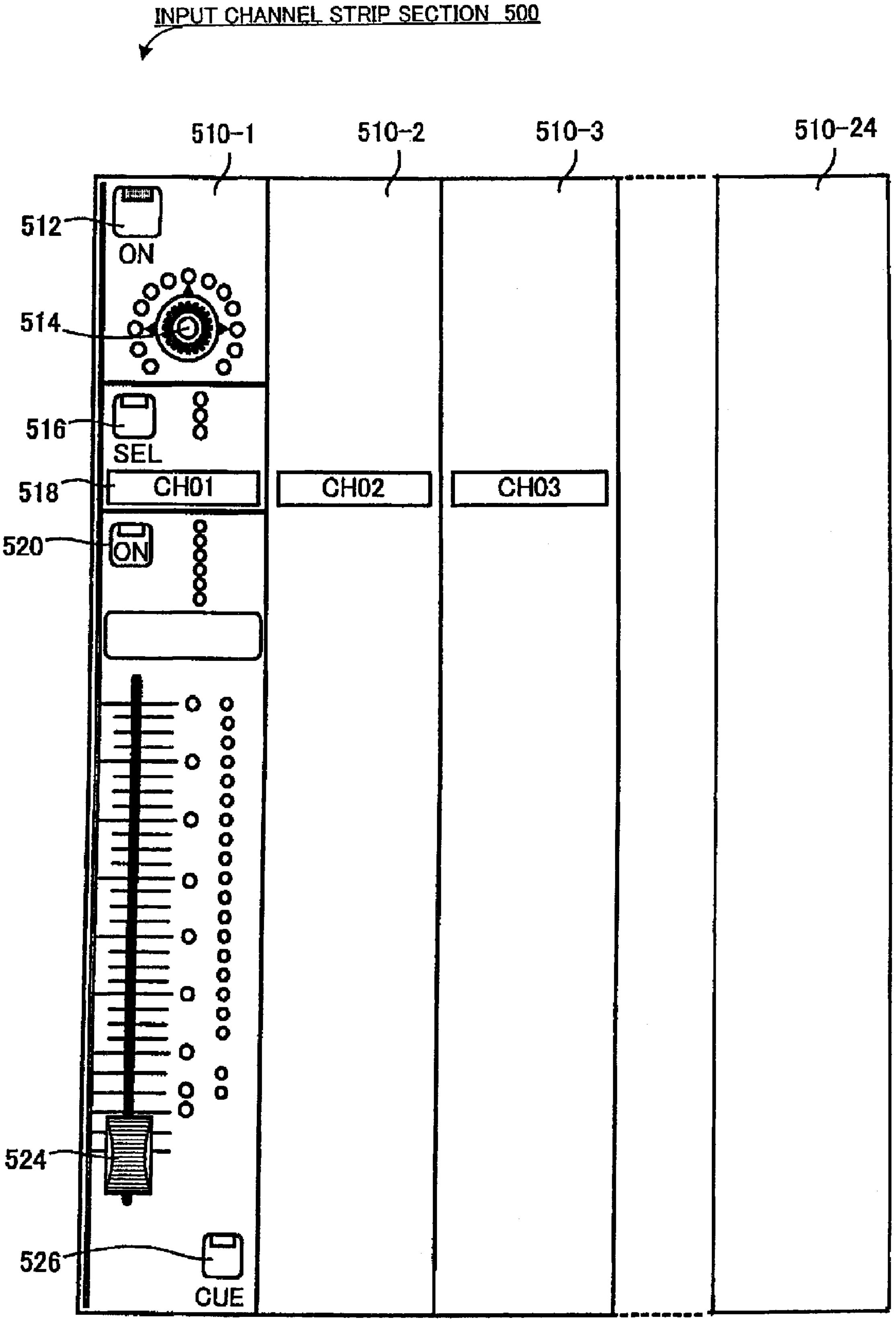
FIG. 9 is a schematic top plan view showing an input channel strip section of the digital mixer.

3.2. Input Channel Strip Section 500:

Specific construction of the input channel strip section 500 will be described below with reference to FIG. 9. The input channel strip section 500 includes "24" channel strips 510-1-510-24. In the instant embodiment, there are provided "48" input channels as noted earlier, and these 48 input channels are divided into two layers, 24 channels per layer. When either one of the layers has been selected, the 24 input channels belonging to the selected layer are assigned to the channel strips 510-1-510-24 so that sound volumes etc. can be adjusted as desired. Hereinafter, the input channels thus assigned to the individual channel strips will be called "assigned input channels". The channel strips 510-1-510-24 are constructed similarly, and thus the following paragraphs representatively describe detailed construction of only the channel strip 510-1.

In the channel strip 510-1, the rotary encoder 514 functions as follows on the basis of the operation mode selected. Specifically, when the "FLIP mode" is OFF in the "MIXSEND mode", the rotary encoder 514 functions as an operator for setting a send level (i.e., signal delivery level) to the to-be-operated MIX bus. In the "GAIN/ATT mode", the rotary encoder 514 functions as an operator for adjusting a gain of a head amplifier or attenuation amount of an attenuator in an input portion of the selected channel control section 300. Further, in the "ALT•LAYER mode", the rotary encoder 514 functions as an operator for setting a fader amount of a channel belonging to the non-selected channel layer (hereinafter referred to as "corresponding other-layer channel".

For example, when the layer of "$1^{st}$-$24^{th}$ input channels" is selected for the input channel strip section 500, the assigned input channel to the channel strip 510-1 is the first input channel, in which case the channel strip 510-1 corresponds to the $25^{th}$ input channel in the non-selected layer of "$25^{th}$-$48^{th}$ input channels". Namely, in this case, the $25^{th}$ input channel in the non-selected layer is the corresponding other-layer channel. In the ALT LAYER mode, the rotary encoder 514 functions as an operator member for setting a fader level of the $25^{th}$ input channel. Functions of the rotary encoder 514 when the FLIP mode in ON will be explained later.

Further, in the channel strip 510-1, the ON key 512 functions as follows on the basis of the operation mode selected. Specifically, when the FLIP mode is OFF in the MIXSEND mode, the ON key 512 functions as a key for switching between the ON and OFF states of "SEND" (signal delivery) to the to-be-operated MIX bus. But, when the FLIP mode is ON, the ON key 512 functions as a key for switching between the ON and OFF states of the assigned input channel itself. Once the assigned input channel itself is brought to the OFF state, no sound signal is output any longer from the assigned input channel to any one of the MIX buses. The ON key 512 has an LED built therein, which is, in each of the operation modes, illuminated when the corresponding function is turned on but deilluminated when the corresponding function is turned off.

The SEL key 516 is a key for instructing that a channel to be operated in the selected channel control section 300, bus operator section 200 (MIXSEND mode), etc. (hereinafter called "selected channel") be set as the assigned input channel. The SEL key 516 is provided in each of the channel strips 510-1-510-24, and the SEL key 516 in only one of the channel strips 510-1-510-24 can be selectively turned on. Thus, once the SEL key 516 is depressed to be set to the ON state in any one of the channel strips 510-1-510-24, the SEL keys 516 in the other channel strips are compulsorily turned off.

Further, in the input channel strip section 500, a display element 518 displays a name (four letters at the maximum) of the assigned input channel, and the ON key 520 functions as follows on the basis of the operation mode selected. Specifically, in the FLIP mode, the ON key 520 functions as a key for switching between the ON and OFF states of "SEND" (signal delivery) to the to-be-operated MIX. In each of the other operation modes than the FLIP mode, the ON key 520 functions as a key for switching between the ON and OFF states of the assigned input channel itself. The ON key 520 too has an LED built therein, which is illuminated when the corresponding function is turned on but deilluminated when the corresponding function is turned off.

The input channel strip section 500 also includes an electric fader 524, which functions as follows on the basis of the operation mode selected. Specifically, when the FLIP mode is OFF, the electric fader 524 functions as an operator for setting a fader level of the corresponding input channel. 526 represents a CUE key that switches between CUE ON and CUE OFF states of the assigned input channel. Once the CUE (i.e., selection of a monitoring channel) is turned on, the sound signal of the assigned input channel is supplied to the monitor device 16 for monitoring by the human operator.

Now, functions of the rotary encoder 514 and electric fader 524 when the FLIP mode in ON are explained. If the main operation mode is the "MIXSEND mode", the rotary encoder 514 functions as an operator for setting a fader level of the corresponding input channel, while the electric fader 524 functions as an operator for setting a send (signal delivery) level to the to-be-operated MIX bus. Namely, the functions of the rotary encoder 514 and electric fader 524 when the FLIP mode is OFF are reversed as compared to those when the FLIP mode is ON.

If the main operation mode is the "ALT•LAYER mode" when the FLIP mode is ON, the rotary encoder 514 functions as an operator for setting a send level of the corresponding other-side channel ($25^{th}$ input channel in the illustrated example) to the to-be-operated MIX bus, and the electric fader 524 functions as an operator for setting a send level to the to-be-operated MIX bus of the assigned input channel.

Of the above-described settings, the fader levels of the individual input channels etc., send levels from the input channels etc. to the MIX buses etc., send ON/OFF states, ON/OFF states of the input channels etc., set amounts of GAIN/ATT, and the like, are parameters directly influencing sound signals. Therefore, these parameters are stored in the current area 14*a* as current scene data. The main operation mode, FLIP mode, etc., on the other hand, do not directly influence sound signals, and they are intended to set a function or displaying style as regards, for example, "to which one of the electric fader 524 and rotary encoder 51 a fader level change function is currently assigned, or by which of the operating positions of the fader 524 and encoder 514 the fader level is to be displayed". Thus, the main operation mode, FLIP mode, etc. are stored in the current area 14*a* as snapshot data.

Figure 10:
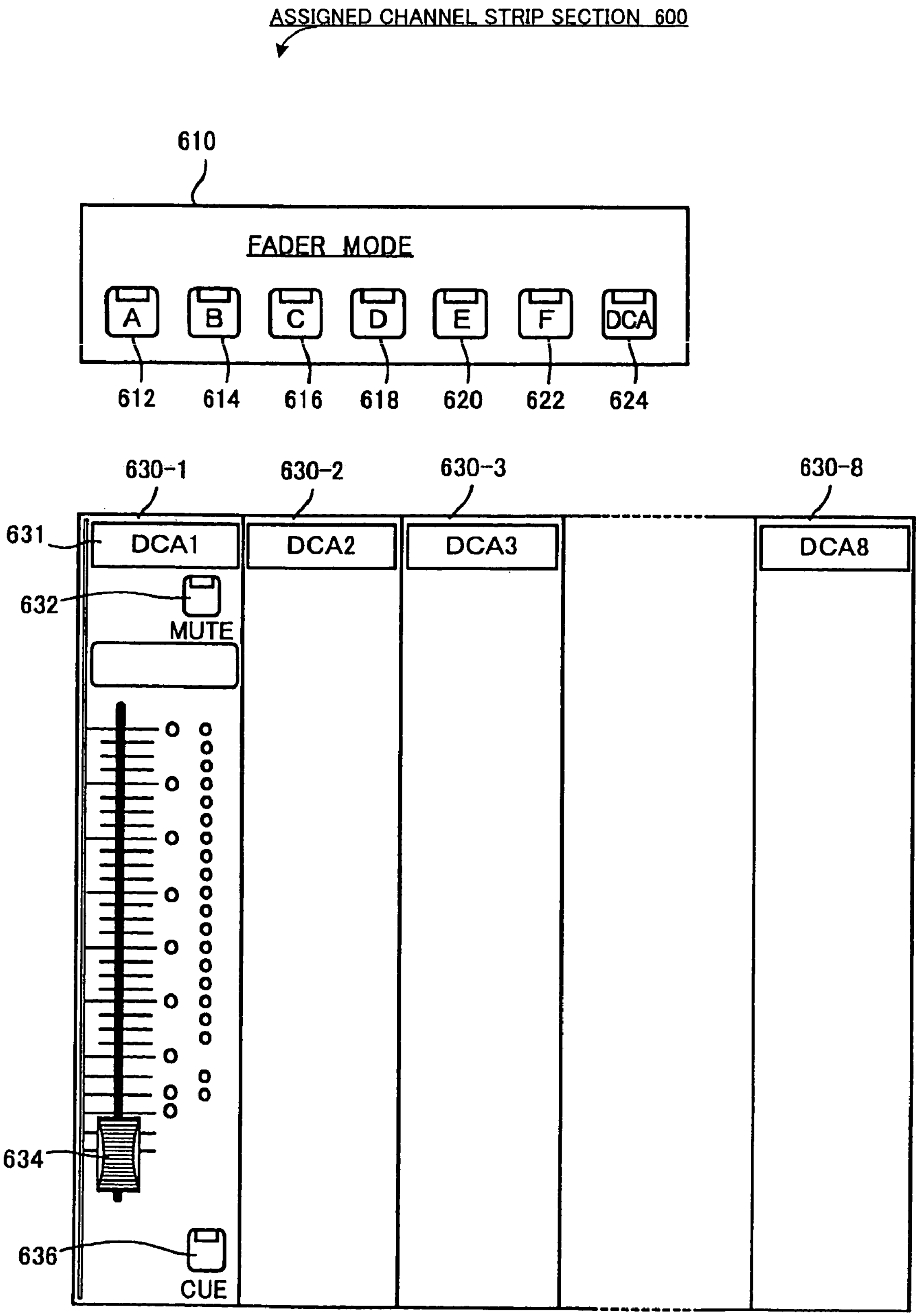
FIG. 10 is a schematic top plan view showing an assigned channel strip section of the digital mixer.

3.3. Assigned Channel Strip Section 600:

Next, a detailed construction of the assigned channel strip section 600 will be described with reference to FIG. 10.

The assigned channel strip section 600 includes "8" (eight) channel strips 630-1-630-8 which are constructed generally identically. Various functions can be assigned to these channel strips 630-1-630-8. Particular mode in which different functions are assigned to these channel strips 630-1-630-8 on a one-to-one basis is referred to as a "one fader mode", and functions corresponding to a total of seven different "fader modes" can be assigned to the channel strips. Reference number 610 represents a fader mode selection section, which allows the human operator to select any one of the fader modes via keys 612-622 provided therein; any one of the keys 612-622 can be selectively activated or turned on by the human operator.

Examples of the functions (operation modes) assigned to the individual channel strips include sound volume adjustment of the input channel (input channel mode), sound volume adjustment of the MIX output channel (MIX output channel mode), gain adjustment of the effect return section 31 (see FIG. 2) (effecter mode), DCA (Digital Controlled Amplifier or Digital Controlled Attenuator) level adjustment (DCA mode), etc. The sound volume adjustment of the input channel can be performed in the above-mentioned input channel strip section 500; however, such sound volume adjustment can also be performed on the input channels belonging to the layer not currently selected, if the input channels are assigned to the channel strips 630-1-630-8.

In the instant embodiment, the bus operator section 200 includes rotary encoders (as will be later detailed), and the sound volume adjustment of the individual MIX output channels can be carried out by such rotary encoders. In addition, by allocating any of the MIX output channels etc., having particularly high frequency of use, to any of the channel strips, the instant embodiment can enhance the operability of the corresponding MIX output channel. The DCA (Digital Controlled Amplifier or Digital Controlled Attenuator) scheme employed in the instant embodiment is explained below. The DCA scheme is a technique where a same or common fader (namely, DCA fader), separate from the faders of the input channels, is allocated to a plurality of input channels etc. and where gains set by the faders of the individual input channels are multiplied by a gain set by the DCA fader so as to determine respective gains of the plurality of input channels. The DCA mode is used primarily in sound volume control of a large-size musical instrument, such as a piano or drum, or a part of an orchestra.

In general, musical sounds performed by a piano or other large-size musical instrument are picked up by a plurality of microphones. These microphones are allocated to different input channels for balance adjustment, and these input channels are allocated to a single DCA fader. Balance among the sound signals picked up by the individual microphones is adjusted via the faders of the input channels, and the overall sound volume of the musical instrument is adjusted by the DCA fader.

Thus, if the function of any one of the channel strips 630-1-630-8 is assigned to the DCA, the fader level of an input channel belonging to a DCA group is set to a result of multiplication between an operated amount of a fader specific to the input channel and an operated amount of a DCA fader (DCA gain).

In the channel strip 630-1, a display 631 displays a name (four letters at the maximum) of an input channel assigned to the channel strip 630-1. Reference numeral 632 represents a DCA_MUTE key, which functions only when the operation mode is a DCA mode. Namely, once a DCA_MUTE key 632 is turned on in the DCA mode, the levels of the input and output channels belonging to the DCA group are all set to "0".

The channel strip 630-1 includes an electric fader 634, which adjusts a DCA level, levels of the input and output channels, etc. depending on the function assigned to the channel strip. In the other operation modes than the DCA mode, a CUE key 636 functions as a key for performing ON/OFF control on supply, to the monitor device 16, of output signals of the corresponding input and output channels or the like. In the DCA mode, the CUE key 636 functions as a key for simultaneously performing ON/OFF control of the CUE keys of all the input channels belonging to the DCA group. Note that the other channel strips 630-2-630-8 provided in the assigned channel strip section 600 are constructed similarly to the channel strip 630-1.

Here, each DCA gain directly influences sound signals, and thus the DCA gain is included in the current scene data. The fader mode selected by the keys 612-622, on the other hand, directly influences sound signals, and it is intended to set a function of each of the DCA faders. Thus, the fader mode is included in the current snapshot data.

3.4. Selected Channel Control Section 300:

Next, details of the selected channel control section 300 will be described with reference to FIGS. 7 and 8. As illustrated in FIG. 7, the selected channel control section 300 includes an attenuator section 310, which performs attenuation, phase switching, insertion effect impartment, etc. of the selected channel. Noise gate section 320 makes noise gate settings of the selected channel, and a level meter section 340 displays a sound signal level of the selected channel.

The selected channel control section 300 also includes a channel selection section 350 which designates a selected channel; note that the selected channel can also be designated by the SEL key 516 of the input channel strip section 500, etc. Display 352 displays a channel number of the selected channel. INC (i.e., increment) key 354 increments the channel number of the selected channel by one, and a DEC (i.e., decrement) key 356 decrements the channel number of the selected channel by one.

Reference numeral 364 represents a COPY key for copying settings of the selected channel control section 300 to a copy buffer (predetermined area of the RAM 14). PASTE key 368 is operable to reflect settings, stored in the copy buffer, in the selected channel control section 300 as settings of the selected channel. Group setting section 370 performs an operation for including the selected channel in the DCA group or the like, or excluding the selected channel from the DCA group or the like. Delay section 380 sets delay characteristics of a sound signal.

Further, as shown in FIG. 8, the selected channel control section 300 also includes a compressor section 400, which sets an internal compressor of the selected channel. Reference numeral 430 represents an equalizer section, which sets frequency characteristics of the selected channel. Rotary encoder 438 sets a center frequency of the high frequency band (HIGH), and the center frequency set by the rotary encoder 438 is displayed on a display 434. Rotary encoders 437 and 432 adjust a gain and Q value, respectively, at the center frequency of the high frequency band (HIGH). Operated amounts of the rotary encoders 437 and 432 are indicated by LEDs arranged circularly around the rotary encoders 437 and 432. Similar operators and displays are also provided in relation to the high medium frequency band (HIGH MID), low medium frequency band (LOW MID) and low frequency band (LOW). High-pass filter setting section 480 makes settings for a high-pass filter to be applied to a sound signal.

Of the above-mentioned parameters, the "selected channel" set by the channel selection section 350 is stored in the current area 14*a* as current snapshot data. Further, settings of the noise gate section 320, group setting section 370, compressor section 400 and equalizer section 430 are stored as current scene data.

Figure 6:
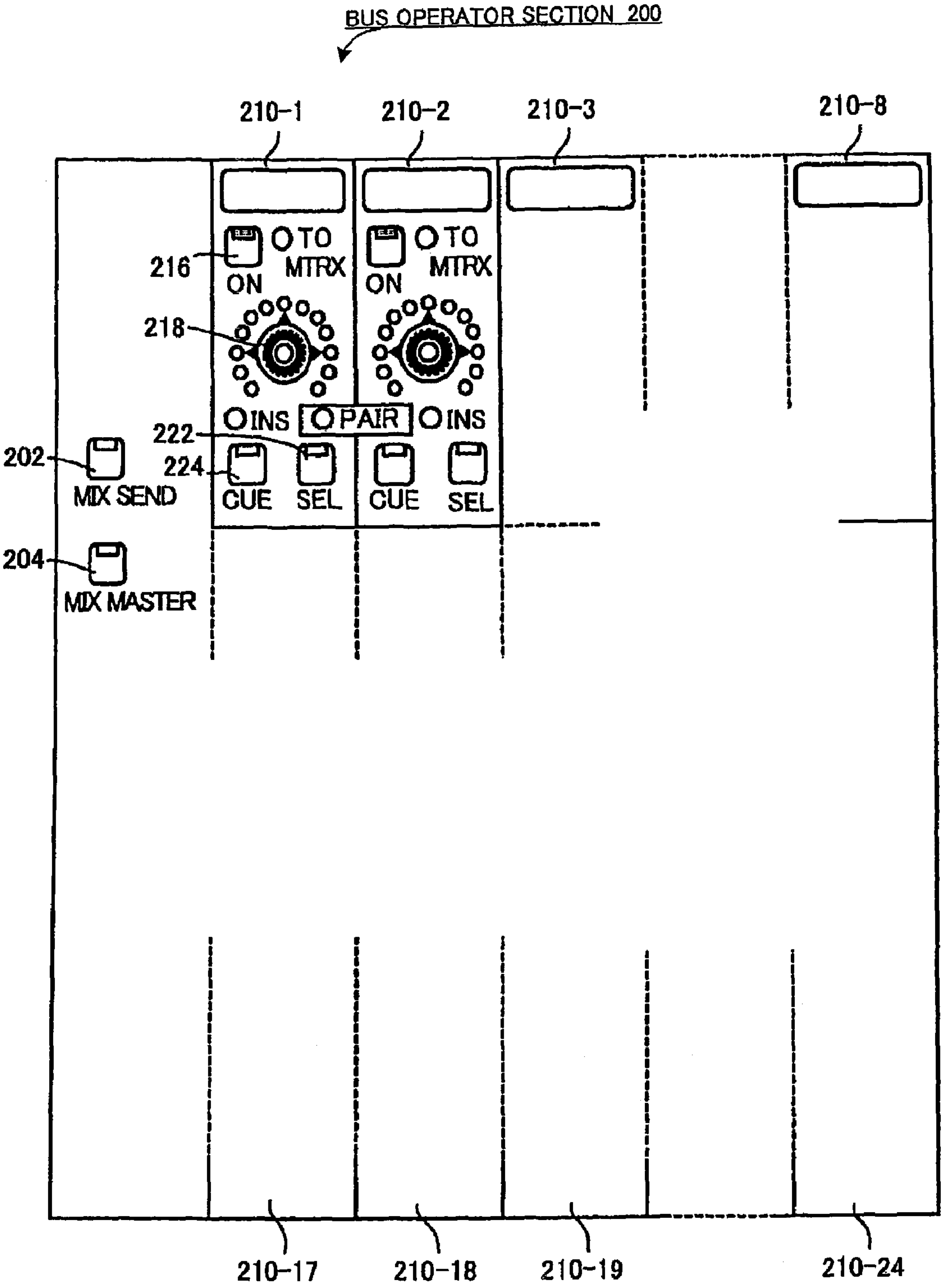
FIG. 6 is a schematic top plan view of a bus operator section of the digital mixer.

3.5. Bus Operator Section 200:

Next, a detailed construction of the bus operator section 200 with reference to FIG. 6. In the bus operator section 200, either one of a "mix send mode" and "mix master mode" can be selected. The mix send mode is an operation mode for, when any of the input channels is a selected channel, controlling levels of signals to be supplied (i.e., send levels) from the input channel to a plurality of the MIX buses. For example, if the first input channel has been selected by the SEL key 516 of the input channel strip section 500, then signal send levels from the o first input channel to the "24" (twenty four) MIX buses are adjusted in the bus operator section 200. Further, the mix master mode is an operation mode for adjusting levels of the individual channels in the MIX output channel section 36. Note that, when any of the output channels is a selected channel, only the mix master mode is selectable, i.e. the mix send mode is non-selectable. If the selected channel has been switched to any one of the MIX output channels while the mix send mode is selected, the bus operator section 200 is brought to an operation mode where neither of the mix send mode and mix master mode is selected, so that any operation on the bus operator section 200 is invalidated.

The bus operator section 200 also includes a mix send key 202 and mix master key 204, each of which shifts the operation mode to either the mix send mode or the mix master mode each time it is depressed. Each of the mix send key 202 and mix master key 204 has a built-in LED that is illuminated while the corresponding operation mode is being selected. Reference numerals 210-1-210-24 represent bus control sections, which correspond to the "24" MIX buses. The bus control section 210-1 includes an ON key 216, rotary encoder 218, CUE key 224 and SEL (i.e., selection) key 222. Note that the other bus control sections 210-2-210-24 also include similar operators. Functions of these operators will be detailed in relation to the different operation modes.

3.5.1. Mix Send Mode:

First, in the mix send mode, the bus control section 210-*n* (n is an arbitrary number in the range of 1-24) is associated with the n-th MIX bus, and the bus control sections 210-*n* functions as a group of operators for performing control related to signal supply from a selected channel (in this case, m-th input channel) to the n-th MIX bus. In the instant mix send mode, the ON key 216 functions as a key for switching, in a toggle-like manner, between ON and OFF states of the signal supply from the m-th input channel to the n-th MIX bus.

Further, in the mix send mode, the rotary encoder 218 functions as an operator for adjusting the send level from the m-th input channel to the n-th MIX bus in the input channel adjustment section 30. In this mode, the CUE 224 does not function and is constantly kept in a deilluminated (non-illuminated) state. Further, the SEL key 222 functions in the same manner as the MIX bus selection keys 109-1-109-24 provided in the bus selection section 100, i.e. the SEL key 222 functions as a key for selecting a to-be-operated MIX bus in an interlocked relation to the corresponding MIX bus selection key 109-*n*. However, the SEL key 222 is constantly kept in a deilluminated state, and the selected to-be-operated MIX bus is displayed only in the corresponding MIX bus selection key 109-*n*.

3.5.2. Mix Master Mode:

In the mix master mode, the bus control section 210-*k* (k is an arbitrary number in the range of 1-24) is associated with the k-th MIX output bus in the MIX output channel section 36, and the bus control section 210-*k* functions as a group of operators for performing control in the associated channel. In the instant mix master mode, the ON key 216 functions as a key for switching, in a toggle-like manner, between ON and OFF states of the entire k-th MIX output channel. The rotary encoder 218 functions as an operator for adjusting the sound volume level of the MIX output channel.

Further, in the instant operation mode, the CUE key 224 functions as a key for switching, in a toggle-like manner, whether or not the sound signal of the MIX output channel should be supplied to the monitor device 16. The SEL key 222 functions as a key for setting the MIX output channel section 36-*k* as a selected channel (i.e., channel that will be operated in the selected channel control section 300 etc.). As set forth above, when any one of the MIX output channels is a selected channel, the operation mode of the bus operator section 200 can not be set to the mix send mode.

Of the above-mentioned parameters, the operation mode (mix send/mix master mode) of the bus operator section 200, selected channel, etc. are stored in the current area 14*a* as current snapshot data. On the other hand, the send level and ON/OFF state of signal supply set in the mix send mode and the ON/OFF state of the entire MIX output channel and send level set in the mix master mode are stored as current scene data.

Figure 4:
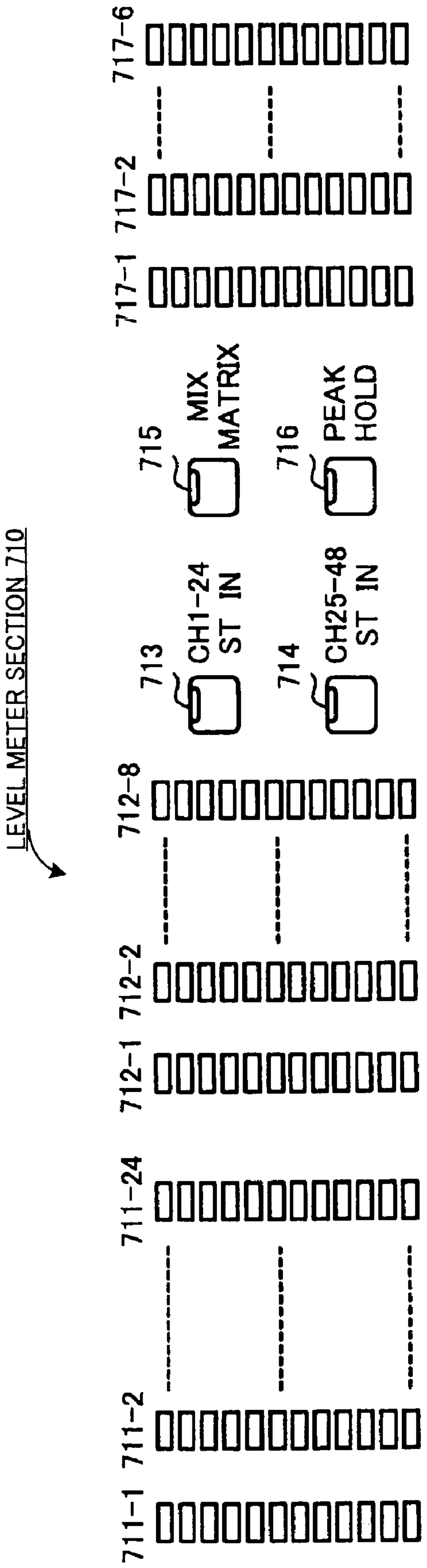
FIG. 4 is a schematic plan view of a level meter section of the digital mixer.

3.6. Level Meter Section 710:

Specific construction of the level meter section 710 is explained with reference to FIG. 4. In the figure, reference numerals 711-1 to 711-24 represent "24" (twenty four) level meters and 712-1 to 712-8 represent "8" (eight) level meters, which display levels of sound signals assigned thereto. Any of assigning buttons 713 and 715 is selectively turned on to designate sound signals to be assigned to the level meters.

Namely, the assigning button 713 assigns the output signals of the 1st to 24th input channels to the level meters 711-1 to 711-24 and the output signals of the 1st to 4th stereo input channels (a total of eight left and right channels) to the level meters 712-1 to 712-8. The assigning button 714 assigns the output signals of the 25th to 48th input channels to the level meters 711-1 to 711-24 and the output signals of the 1st to 4th stereo input channels to the level meters 712-1 to 712-8. Further, the assigning button 715 assigns the output signals of the 1st to 24th MIX output channels to the level meters 711-1 to 711-24 and the output signals of the MATRIX output channels to the level meters 712-1 to 712-8.

Reference numerals 717-1 to 717-6 represent level meters, which indicate levels of sound signals selected by the various CUE keys. Peak-hold button 716 switches, in a toggle-like manner, between ON/OFF states of peak-hold display (i.e., continuation, for a predetermined time, of display of the peak levels) of all of the above-mentioned level meters. All of the above-mentioned buttons 713-716 are intended to set displaying styles of all of the level meters, and thus the settings of the buttons 713-716 will be stored into the current area 14*a* as current snapshot data.

Figure 11:
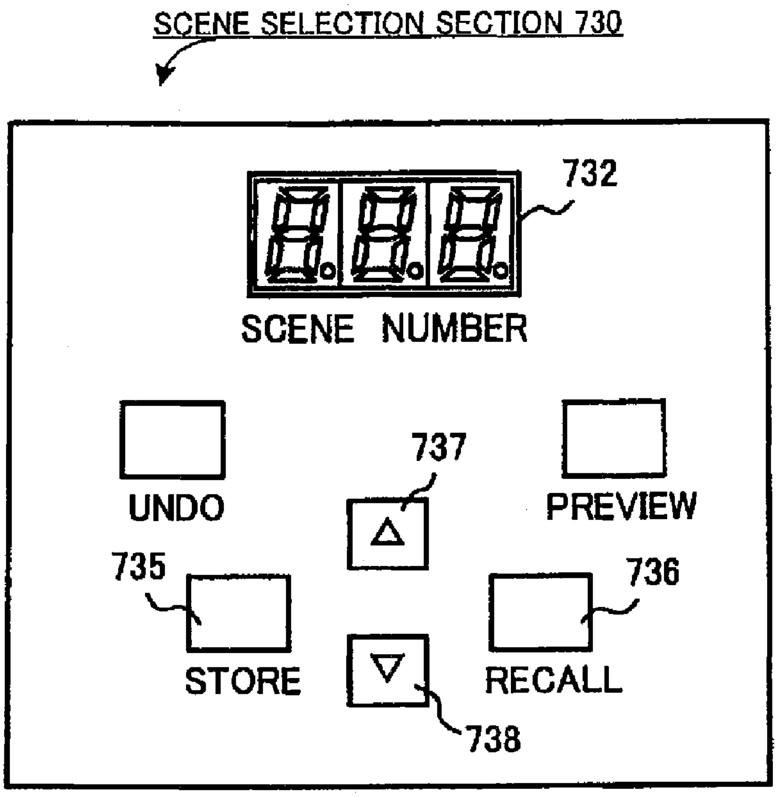
FIG. 11 is a schematic top plan view showing a scene selection section of the digital mixer.

3.7. Scene Selection Section 730:

Specific construction of the scene selection section 730 is explained with reference to FIG. 11. In the figure, reference numeral 732 represents a scene number display that displays a specific scene number of scene data to be recalled or stored. The "scene number" is a unique number assigned to each scene data set. 737 and 738 represent an Up button and a Down button, respectively, which are operable to increment or decrement the scene number displayed on the display 732. 735 represents a Store button that is operable to store current scene data into the scene area 12*b* as scene data of the displayed scene number. 736 represents a Recall button that is operable to recall (or reproduce) the scene data of the displayed scene number into the current area 14*a* as current scene data. The scene recall and scene storage operations will be later described in detail.

Figure 12:
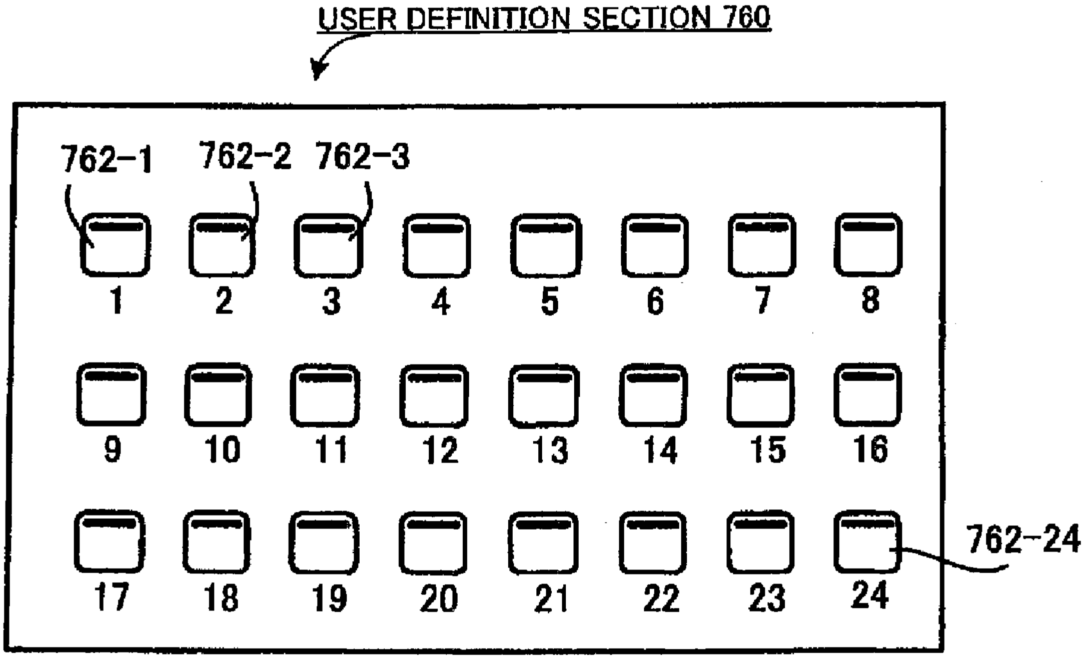
FIG. 12 is a schematic top plan view showing a user definition section of the digital mixer.

3.8. User Definition Section 760:

Specific construction of the user definition section 760 is explained with reference to FIG. 12. In the figure, reference numerals 762-1 to 762-24 represent user definition buttons, to which desired ones of a plurality of predetermined functions can be assigned. Functions for storing and recalling the snapshot data can also be assigned to the user definition buttons. Two or more functions can be assigned to any one of these buttons, by differentiating a button-depressing time length from a turned-on time to turned-off time of the button. Thus, in the instant embodiment, one set of snapshot data is assigned to one of the buttons so that the storage or recall operation can be performed depending on the button-depressing time length, as will be later described.

Figure 13:
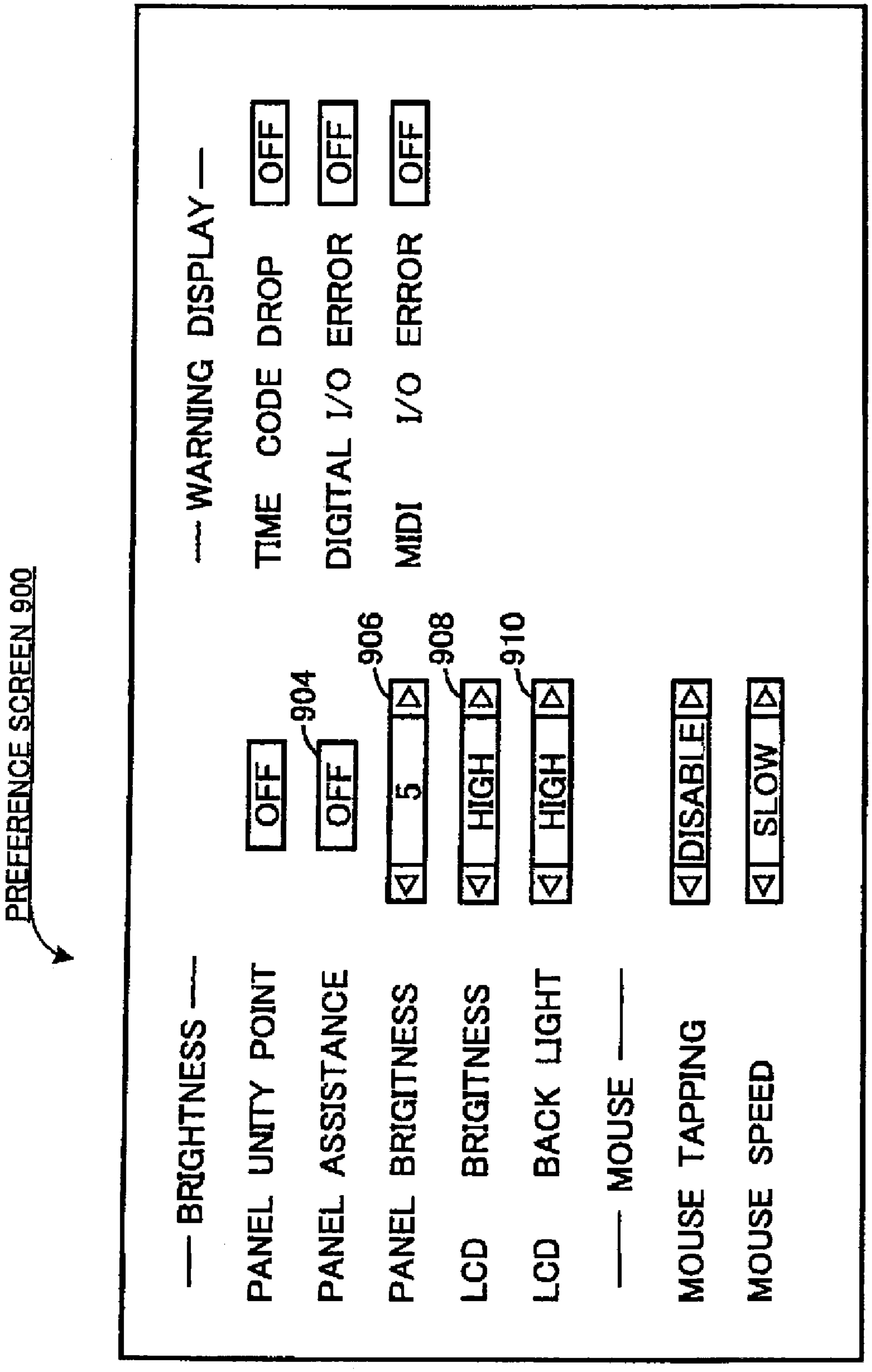
FIG. 13 is a diagram showing details of a preference screen displayed on a display device of the digital mixer.

4. Construction of Principal Screen:

4.1. Preference Screen 900:

As noted earlier, the human operator can select a screen to be displayed on the display device 720, by manipulating the screen selection section 750. Here, principal ones of the selectable screens are explained. First, FIG. 13 shows details of a preference screen 900, in which reference numeral 904 represents a panel assistance button. When the operated amount of one of the rotary encoders (e.g., rotary encoder 514 of FIG. 9) with circularly-arranged LEDs disposed therearound has exceeded a predetermined fundamental operated amount (e.g., center position, 0 dB position or the like), the panel assistance button 904 is operated to select whether or not the brightness or luminance of the LEDs, corresponding to the fundamental operated amount, should be made higher than the normal luminance value.

906 represents a panel brightness selection section, which is provided for selecting whether or not the LEDs are to be illuminated with a lower luminance than the normal luminance value even when the circularly-arranged LEDs do not correspond to the operated amount of the rotary encoder, and, if so, selecting a desired luminance value lower than the normal luminance value. In this way, even where the digital mixer is installed in a dark place (e.g., among audience seats), the human operator can get, at a glance, the operated amount of the rotary encoder. LCD brightness selection section 908 is provided for selecting a brightness of a color table of the display device (color LCD display) 720. LCD backlight selection section 910 is provided for selecting a brightness of the backlight of the display device 720. Note that all parameters set on the preference screen 900 are stored into the current area 14*a* as current snapshot data.

4.2. GEQ Parameter Screen 950:

Graphic equalizers can be inserted in any desired ones of the above-mentioned input/output channels etc. which are located at the input or output stage. Once predetermined operation is detected on the screen selection section 750, a GEQ parameter screen 950 of FIG. 14 for setting characteristics of the inserted graphic equalizers is displayed on the display device 720.

Figure 14:
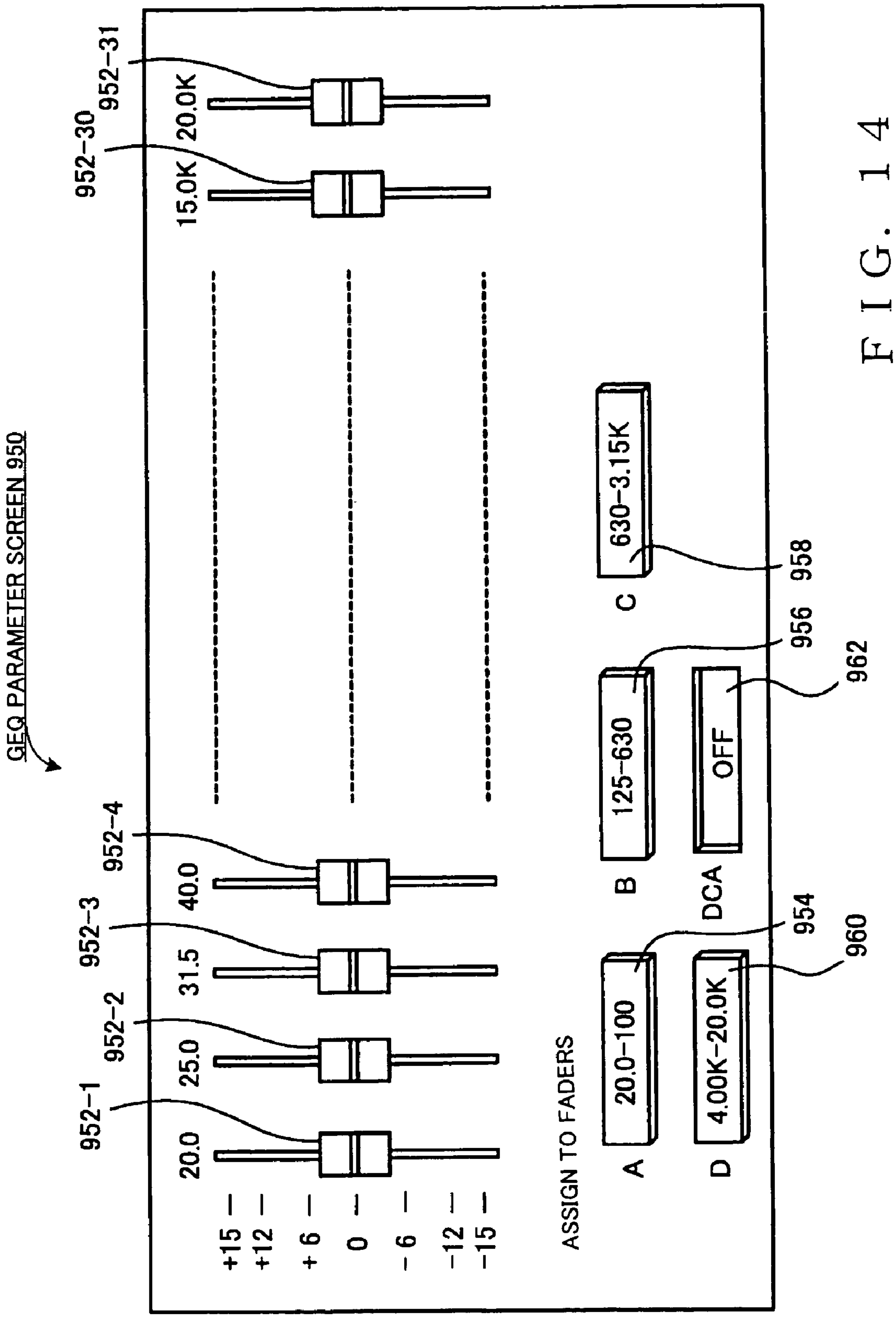
FIG. 14 is a diagram showing details of a GEQ parameter screen displayed on the display device of the digital mixer.

In FIG. 14, reference numerals 952-1-952-31 represent "31" (thirty one) faders, each of which, in response to dragging operation by the mouse, boosts or attenuates one of "31" divided sound signal frequency bands. Therefore, in order to set characteristics of the graphic equalizers, it is essentially necessary to perform predetermined operation on the GEQ parameter screen 950. In the instant embodiment, the "31" frequency bands are grouped into four groups (group A-group D) each consisting of eight or seven frequency bands, and operation of the frequency bands belonging to any one of the groups can be allocated to one of the electric faders of the assigned channel strip section 600 (e.g., fader 634).

Further, 954, 956, 958 and 960 represent group selection buttons, each of which is operable to select any one of the groups that is to be allocated to the assigned channel strip section 600. Group-off button 962 is operable to cancel the group allocation to the assigned channel strip section 600. Of the parameters set on the GEQ parameter screen 950, the boost/attenuation amounts of the individual frequency bands, set via the 952-1-952-31, directly operate on the sound signal frequency characteristics; therefore, the boost/attenuation amounts are stored in the current area 14*a* as current scene data. On the other hand, the ON/OFF states of the group selection buttons 954, 956, 958 and 960 and the group-off button 962 define functions of the assigned channel strip section 600; therefore, these ON/OFF states are stored in the current area 14*a* as current snapshot data.

5. Behavior of the Embodiment:

5.1. General Behavior:

Once there has been occurred an operation event of any one of the operators, such as the faders, rotary encoders and keys, in the digital mixer, a routine corresponding to the content of the operation is started up. Particularly, when an ordinary operation event (different from special operation events, such as reproduction of a scene or snapshot) has occurred, the parameter stored in the current area 14*a* is updated on the basis of the content of the operation. For example, when any one of the electric faders and rotary encoders has been operated, control data corresponding to a new operated amount of the operated operator, such as level data and frequency data, are stored into corresponding locations of the current area 14*a*. When any one of the keys has been operated, a new ON/OFF state etc. of the operated key are stored.

If the parameter having been updated is a parameter belonging to the current scene data, then various parameters in the mixing algorithm (FIG. 3), i.e. stored contents of the parameter register provided in the signal processing section 6, are updated on the basis of the current scene data. Then, on the basis of the updated contents of the current area 14*a*, various setting operations on the operation panel 2 are carried out, such as illumination/deillumination of the LEDs built in the keys, illumination/deillumination of the LEDs provided around the rotary encoders, change to the displayed contents on the various display devices and elements, driving of the electric faders, etc.

Figure 16A:
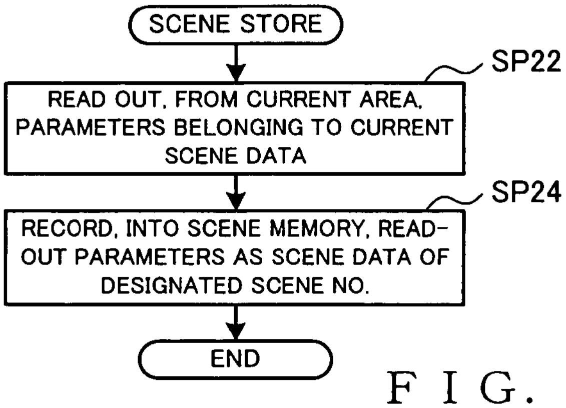
FIGS. 16A and 16B are flow charts showing example operational sequences of a scene store/recall routine.

5.2. Store/Recall of Scene Data:

Next, a description is made about operations to be performed when the Store button 735 or Recall button 736 has been depressed in the scene selection section 730. Namely, once there has occurred a depression event of the Store button 735, a scene store routine of FIG. 16A is started up. At step SP22 of the scene store routine, parameters corresponding to the "current scene data" are read out from the current area 14*a*. At next step SP24, the thus read-out current scene data are stored into the scene area 12*b* as scene data of a particular number being displayed on the scene number display section 732.

Figure 16B:
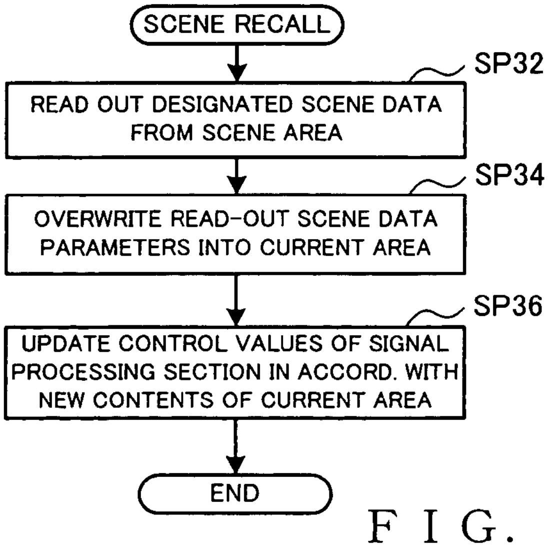

Once there has occurred a depression event of the Recall button 736, a scene recall routine of FIG. 16B is started up. At step SP32 of the scene recall routine, scene data designated by the scene number display section 732 are read out from the scene area 12*b*. At next step SP34, the thus read-out scene data are written over current scene data in the current area 14*a*. At following step SP36, control values (parameters) set in the signal processing section 6 are updated in accordance with the overwritten, new contents of the current area 14*a*. In this way, sound signals to be output from the waveform I/O section 4 can be made to correspond to the updated control values.

5.3. Store/Recall of Snapshot Data:

Next, a description is made about operations to be performed when any one of the user definition buttons assigned to snapshot data has been operated. The assignment of the user definition buttons to the snapshot data may be made in any manner desired by the user. For example, if eight different sets of snapshot data are present, then the first to eighth sets of snapshot data may be allocated to the user definition buttons 762-1-762-8.

Figure 15:
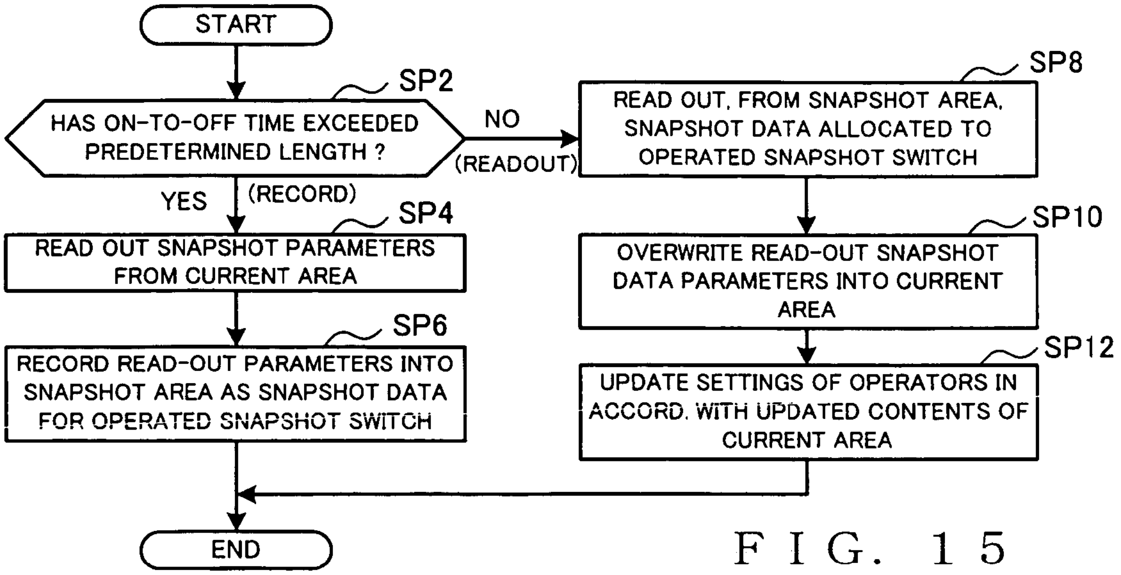
FIG. 15 is a flow chart showing an example operational sequence of a snapshot data processing routine.

Once any one of the user definition buttons assigned to these sets of snapshot data is turned on and then turned off, a snapshot data processing routine of FIG. 15 is started up. At step SP2 of FIG. 15, a determination is made as to whether a button depression time (length), from the turned-on time to the turned-off time of the user definition button, has exceeded a predetermined time length. If a YES determination is made at step SP2, the snapshot data processing routine proceeds to step SP4, where parameters belonging to the current snapshot data are read out from the current area 14*a*. At next step SP6, the thus read-out parameters are recorded into the snapshot area 12*c* as snapshot data of a particular number corresponding to the depressed user definition button.

If, on the other hand, the button depression time has not exceeded the predetermined time length (NO determination at step SP2), the routine branches to step SP8, where snapshot data allocated to the depressed user definition button are read out from the snapshot area 12*c*. Then, at step S10 following step SP8, parameters included in the thus read-out snapshot data are overwritten into corresponding locations of the current area 14*a*. At next step SP12, settings of the various operators and display devices and elements on the operation panel 2 are updated on the basis of the updated contents of the current area 14*a*.

Let's now consider a case where the first MIX bus is selected, before the recall of snapshot data, as the to-be-operated MIX bus of a given strip (e.g., 510-1) of the input channel strip section 500 (FIG. 9) and then the second MIX bus is selected, after the recall of snapshot data, as the to-be-operated MIX bus of the given strip. Further, to simplify the explanation, let it be assumed that the FLIP mode is in the ON state both before and after the recall. In such a case, although, before the snapshot data recall, the operating position of the electric fader 524 of the strip (510-1) was set at a position corresponding to a send level from the assigned input channel to the first MIX bus, the operating position of that electric fader 524 is automatically driven, in response to the snapshot data recall, to a position corresponding to a send level from the assigned input channel to the second MIX bus.

Similarly, if the fader mode of the assigned channel strip 600 before the recall of snapshot data is changed in response to the snapshot data recall, the electric faders 634 etc. of the assigned channel strip 600 are automatically driven, even if there has been no variation at all in the fader level, DCA level, etc. of each of the input/output channels. Namely, in the instant embodiment, the faders etc. (signal operators) for varying the current scene data are automatically driven through the recall of the snapshot data.

6. Modification:

The present invention may be modified variously as follows without being limited to the above-described embodiments.

(1) Each of the embodiments has been described above as controlling the digital mixer with programs executed by the CPU 10. Only such programs may be stored on a recording media, such as a CD-ROM or flexible disk, for subsequent distribution, or may be distributed through a communication path.

(2) Whereas each of the embodiments has been described above as performing the recall operation of the scene data and snapshot data through separate operators (i.e., in response to separate instructions), the scene data and snapshot data may be linked to each other so that, as a scene is recalled, corresponding snapshot data can be automatically recalled.

(3) The embodiments have been described in relation to the example where, when operation for storing the current snapshot data has been performed, all parameters belonging to the current snapshot data are stored in the snapshot area 12*c* as snapshot data. In an alternative, only some of the parameters, selected from the current snapshot data, may be stored in the snapshot area 12*c*. When the snapshot data are recalled as well, only a selected portion of the parameters belonging to the snapshot data, rather than all of the parameters, may be recalled to update the current snapshot data.

(4) Each of the embodiments has been described above as switching between the snap shot data recall and store processes in accordance with a depressed time length of the user definition button assigned to the snap shot data. Alternatively, separate operators may be allocated to the recall and store processes of the snapshot data so that any desired one of the recall and store processes can be executed irrespective of the depression time length of the corresponding operators.

(5) Further, whereas the embodiments have been described above in relation to the case where the basic principals of the present invention are applied to a digital mixer, the basic principals of the present invention may also be applied to an analog mixer that processes sound signals in an analog manner.

What is claimed is:

1. A mixer apparatus for performing signal processing and mixing processing on sound signals of a plurality of channels, comprising:

a current data storage section that stores therein, as current data, current scene data and current snapshot data separately from each other, said current scene data comprising a group of parameters for directly varying individual ones of the sound signals, said current scene data including parameters for setting a characteristic of a graphic equalizer for designating, for a predetermined sound signal, a boost or attenuation amount per each of a plurality of frequency bands, said current snapshot data comprising a group of parameters defining at least one of functions of individual operators and display styles of individual display devices on an operation panel, each of said parameters belonging to only one of either the scene data or the snapshot data;

a signal processing section that performs the signal processing and the mixing processing on the sound signals of a plurality of input channels on the basis of the current scene data, and outputs a result of the mixing processing as sound signals of a plurality of output channels;

an operator section that includes a channel strip including at least a fader operator and a rotary encoder and capable of being assigned an input or output channel, and a function selecting operator for selecting functions of the fader operator and the rotary encoder;

a parameter variation section that, in response to detection of user's operation of the fader operator or the rotary encoder in the channel strip, varies a parameter included in the current scene data and corresponding to the channel assigned to the channel strip;

a current snapshot data update section that, in response to operation of the function selecting operator, updates the current snapshot data so as to set functions to be assigned to the fader operator and the rotary encoder;

a snapshot data memory that stores, as snapshot data, content of the current snapshot data including information identifying the functions assigned to the fader operator and the rotary encoder;

a determination section that detects whether or not a predetermined operation button has been turned on by the user and that determines the user's operation of the predetermined operation button to be first-type user operation if a time length of the user's operation of the predetermined operation button is longer than a predetermined time length, but determines the user's operation of the predetermined operation button to be second-type user operation if the time length of the user's operation of the predetermined operation button is not longer than the predetermined time length;

a snapshot storage control section that, in response to the first-type user operation, reads out the current snapshot data from said current data storage section and stores the read-out current snapshot data into said snapshot data memory as the snapshot data;

a snapshot recall control section that, in response to the second-type user operation, reads out the snapshot data from said snapshot data memory and updates the current snapshot data in accordance with content of the read-out snapshot data;

a control section that sets functions to be assigned to the fader operator and the rotary encoder on the basis of content of the current snapshot data;

a scene data memory that stores a plurality sets of scene data;

a scene data storage control section that, in response to scene store instructing operation by the user, writes the current scene data, currently stored in said current data storage section, into said scene memory as a set of scene data; and a scene data recall control section that, in response to scene recall instructing operation by the user, reads out one set of scene data from among said plurality sets of scene data stored in said scene data memory and writes the read-out set of scene data into said current data storage section as the current scene data.

* * * * *